US012166966B2

(12) United States Patent
Wang et al.

(10) Patent No.: US 12,166,966 B2
(45) Date of Patent: Dec. 10, 2024

(54) VIDEO DECODING AND ENCODING METHOD AND APPARATUS, COMPUTER-READABLE STORAGE MEDIUM AND ELECTRONIC DEVICE

(71) Applicant: TENCENT TECHNOLOGY (SHENZHEN) COMPANY LIMITED, Guangdong (CN)

(72) Inventors: Yingbin Wang, Shenzhen (CN); Xiaozhong Xu, Shenzhen (CN); Shan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 423 days.

(21) Appl. No.: 17/538,357

(22) Filed: Nov. 30, 2021

(65) Prior Publication Data

US 2023/0016694 A1    Jan. 19, 2023

Related U.S. Application Data

(63) Continuation of application No. PCT/CN2020/123049, filed on Oct. 23, 2020.

(30) Foreign Application Priority Data

Nov. 13, 2019    (CN) .......................... 201911107991.2

(51) Int. Cl.
*H04N 19/136*    (2014.01)
*H04N 19/105*    (2014.01)
(Continued)

(52) U.S. Cl.
CPC ......... *H04N 19/105* (2014.11); *H04N 19/136* (2014.11); *H04N 19/176* (2014.11); *H04N 19/513* (2014.11)

(58) Field of Classification Search
None
See application file for complete search history.

(56) References Cited

U.S. PATENT DOCUMENTS

2013/0070857 A1*    3/2013    Kondo ................. H04N 19/44
2017/0078673 A1    3/2017    Kim et al.
(Continued)

FOREIGN PATENT DOCUMENTS

CN    10-2547270 A    7/2012
CN    10-2939758 A    2/2013
(Continued)

OTHER PUBLICATIONS

Daehyeok Gwon et al., "Non-CE3: Simplification of MPM derivation", Joint Video Experts Team (JVET) of ITU-T SG 16 WP 3 and ISO/IEC JTC 1/SC 29/WG 11, JVET-P0294-v2, Oct. 1-11, 2019, pp. 1-8, 16th Meeting: Geneva, CH.
(Continued)

*Primary Examiner* — Christopher G Findley
(74) *Attorney, Agent, or Firm* — Sughrue Mion, PLLC

(57) ABSTRACT

A video decoding and encoding method and apparatus, a computer-readable medium, and an electronic device. The video decoding method includes classifying decoded blocks adjacent to a target block according to information about the decoded blocks to obtain at least one category, obtaining a category identifier corresponding to the target block based on coding information corresponding to the target block, determining a target category corresponding to the target block from the at least one category according to the category identifier corresponding to the target block, determining a predictive vector of the target block based on vectors of decoded blocks included in the target category, and decoding the target block based on the predictive vector.

19 Claims, 5 Drawing Sheets

(51) Int. Cl.
*H04N 19/176* (2014.01)
*H04N 19/513* (2014.01)

(56) References Cited

U.S. PATENT DOCUMENTS

2019/0052875 A1  2/2019  Son et al.
2019/0281290 A1  9/2019  Lee et al.

FOREIGN PATENT DOCUMENTS

| CN | 10-3533349 A | 1/2014 |
|----|--------------|--------|
| EP | 2582138 A1   | 4/2013 |
| EP | 2988506 A1   | 2/2016 |
| KR | 20140065013 A| 5/2014 |

OTHER PUBLICATIONS

International Search Report for PCT/CN2020/123049 dated, Jan. 26, 2021 (PCT/ISA/210).
Written Opinion of the International Searching Authority for PCT/CN2020/123049 dated, Jan. 26, 2021 (PCT/ISA/237).
Communication dated Jun. 19, 2022 from the European Patent Office in EP Application No. 20886946.1.
Extended European Search Report dated Aug. 30, 2022 from the European Patent Office in EP Application No. 20886946.1.

\* cited by examiner

VIDEO DECODING AND ENCODING METHOD AND APPARATUS, COMPUTER-READABLE STORAGE MEDIUM AND ELECTRONIC DEVICE

CROSS-REFERENCE TO RELATED APPLICATION(S)

This application is a continuation application of International Application No. PCT/CN2020/123049, filed on Oct. 23, 2020, which claims priority to Chinese Patent Application No. 201911107991.2, filed with the National Intellectual Property Administration, PRC on Nov. 13, 2019, the disclosures of which are incorporated herein by reference in their entireties.

FIELD

The disclosure relates to the field of computer and communication technologies, and in particular, to a video decoding and encoding method and apparatus, a computer-readable medium, and an electronic device.

BACKGROUND

In video coding standards such as HEVC (high efficiency video coding) and VVC (versatile video coding), variable length coding (variable length coding) is generally used to encode a sequence number of an optimal predictive motion vector (MV) in a candidate predictive MV list, and a smaller sequence number indicates that less bits need to be encoded. However, the technical solution provided in the related art has not fully mined information about an encoded block, and it is difficult to optimize an order of a predictive MV in the list, causing relatively low encoding and decoding efficiency.

SUMMARY

Embodiments of the disclosure provide a video decoding and encoding Method and apparatus, a computer-readable medium, and an electronic device, to improve decoding and encoding efficiency.

Other features and advantages of the disclosure become obvious through the following detailed descriptions, or may be partially learned through the practice of the disclosure.

According to an aspect of the embodiments of the disclosure, a video decoding method may be provided, including: classifying decoded blocks adjacent to a target block to be decoded according to information about the decoded blocks, to obtain at least one category; obtaining a category identifier corresponding to the target block based on coding information corresponding to the target block; determining a target category corresponding to the target block from the at least one category according to the category identifier corresponding to the target block; and determining a predictive vector of the target block based on vectors of decoded blocks included in the target category, and decoding the target block based on the predictive vector.

According to an aspect of the embodiments of the disclosure, a video encoding method may be provided, including: classifying encoded blocks adjacent to a target block to be encoded according to information about the encoded blocks, to obtain at least one category; determining at least one candidate vector of the target block according to vectors of encoded blocks included in categories, one category being corresponding to one candidate vector; selecting a target category corresponding to the target block from the at least one category according to candidate vectors corresponding to the categories; and determining a predictive vector of the target block according to a candidate vector corresponding to the target category, encoding the target block based on the predictive vector, and adding a category identifier of the target category to coding information.

According to an aspect of the embodiments of the disclosure, a video decoding apparatus may be provided, including: a classification unit, configured to classify decoded blocks adjacent to a target block to be decoded according to information about the decoded blocks, to obtain at least one category; an obtaining unit, configured to obtain a category identifier corresponding to the target block based on coding information corresponding to target block; a determining unit, configured to determine a target category corresponding to the target block from the at least one category according to the category identifier corresponding to the target block; and a decoding unit, configured to determine a predictive vector of the target block based on vectors of decoded blocks included in the target category, and decode the target block based on the predictive vector.

According to an aspect of the embodiments of the disclosure, a video encoding apparatus may be provided, including: a classification unit, configured to classify encoded blocks adjacent to a target block to be encoded according to information about the encoded blocks, to obtain at least one category; a determining unit, configured to determine at least one candidate vector of the target block according to vectors of encoded blocks included in categories, one category being corresponding to one candidate vector; a selection unit, configured to select a target category corresponding to the target block from the at least one category according to candidate vectors corresponding to the categories; and an encoding unit, configured to determine a predictive vector of the target block according to a candidate vector corresponding to the target category, encode the target block based on the predictive vector, and add a category identifier of the target category to coding information.

According to an aspect of the embodiments of the disclosure, a computer-readable medium may be provided, storing a computer program, the computer program, when executed by a processor, implementing the video decoding method or video encoding method according to the foregoing embodiments.

According to an aspect of the embodiments of the disclosure, an electronic device may be provided, including: one or more processors; and a storage apparatus, configured to store one or more programs, the one or more programs, when executed by the one or more processors, causing the one or more processors to implement the video decoding method or video encoding method according to the foregoing embodiments.

In the technical solutions provided in some embodiments of the disclosure, decoded blocks adjacent to a target block to be decoded may be classified, then a category identifier corresponding to the target block is obtained according to coding information corresponding to the target block, and a target category corresponding to the target block is determined from at least one category according to the category identifier corresponding to the target block. A predictive vector of the target block is determined based on vectors of decoded blocks included in the target category, and the target block is decoded based on the predictive vector, so that information about the decoded blocks adjacent to the target block can be used to decode the target block, thereby reducing a quantity of redundant predictive vectors. In addition, the decoded blocks are classified, and the target block is decoded based on the vectors of the decoded blocks included in the target category. Therefore, a decoded block relatively highly correlated can also be classified into the target category. In this way, it is also ensured that the decoded block relatively highly correlated has a relatively small sequence number, and decoding efficiency can be improved.

In the technical solutions provided in some embodiments of the disclosure, encoded blocks adjacent to a target block to be encoded may be classified, at least one candidate vector of the target block is determined according to vectors of encoded blocks included in categories, then a target category corresponding to the target block is selected from at least one category according to candidate vectors corresponding to the categories, to determine a predictive vector of the target block according to a candidate vector corresponding to the target category, and the target block is encoded based on the predictive vector, so that information about the encoded blocks adjacent to the target block can be used to encode the target block, thereby reducing a quantity of redundant predictive vectors. In addition, the encoded blocks are classified, and the target block is encoded based on the vectors of the encoded blocks included in the target category. Therefore, an encoded block relatively highly correlated can also be classified into the target category. In this way, it is also ensured that the encoded block relatively highly correlated has a relatively small sequence number, and encoding efficiency can be improved.

It is to be understood that, the foregoing general descriptions and the following detailed descriptions are merely for illustration and explanation purposes and are not intended to limit the disclosure.

BRIEF DESCRIPTION OF THE DRAWINGS

To describe the technical solutions of example embodiments of the disclosure more clearly, the following briefly introduces the accompanying drawings for describing the example embodiments. The accompanying drawings herein are incorporated into and constitute a part of this specification, show embodiments that conform to, and are used together with this specification to describe the principle of the disclosure. The accompanying drawings described below are merely some embodiments of the disclosure, and a person of ordinary skill in the art may further obtain other accompanying drawings according to the accompanying drawings without creative efforts. In addition, one of ordinary skill would understand that aspects of example embodiments may be combined together or implemented alone. In the accompanying drawings.

DESCRIPTION OF EMBODIMENTS

Example embodiments will now be described more thoroughly with reference to the accompanying drawings. However, the example embodiments may be implemented in various forms, and are not to be understood as being limited to the examples described herein. Instead, the embodiments are provided to make the disclosure more thorough and complete and fully convey the idea of the example embodiments to a person skilled in the art.

In addition, the described features, structures or characteristics may be combined in one or more embodiments in any appropriate manner. In the following description, many specific details are provided to give a full understanding for the embodiments of the disclosure. However, a person skilled in the art will notice that, the technical solutions of the disclosure can be implemented without one or more of the following specific details, or the technical solutions of the disclosure can be implemented by using other methods, components, apparatuses, and operations/steps. In other cases, well-known methods, apparatuses, implementations, or operations are not shown or described in detail, to avoid obscuring the aspects of the disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may vary depending on an actual situation.

Figure 1:
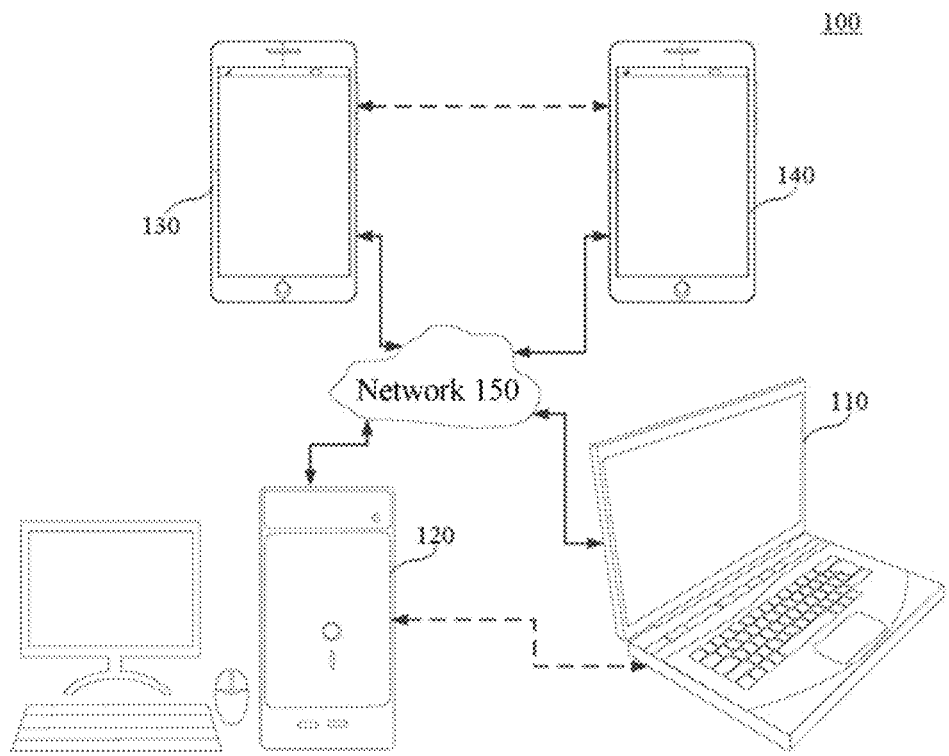
FIG. 1 shows a schematic diagram of an exemplary system architecture to which the technical solutions according to the embodiments of the disclosure are applied.

FIG. 1 shows a schematic diagram of an exemplary system architecture to which the technical solutions according to the embodiments of the disclosure are applied.

As shown in FIG. 1, the system architecture 100 includes a plurality of terminal apparatuses, and the terminal apparatuses may communicate with each other through, for example, a network 150. For example, the system architecture 100 may include a first terminal apparatus 110 and a second terminal apparatus 120 that are interconnected through the network 150. In the embodiment of FIG. 1, the first terminal apparatus 110 and the second terminal apparatus 120 perform unidirectional data transmission. For example, the first terminal apparatus 110 may encode video data (for example, a video picture stream acquired by the first terminal apparatus 110) to transmit the encoded video data to the second terminal apparatus 120 through the network 150. The encoded video data is transmitted in a form of one or more encoded video code streams. The second terminal apparatus 120 may receive the encoded video data from the network 150, decode the encoded video data to restore the video data, and display a video picture according to the restored video data.

In an embodiment of the disclosure, the system architecture 100 may include a third terminal apparatus 130 and a fourth terminal apparatus 140 that perform bidirectional transmission of encoded video data, and the bidirectional transmission may occur, for example, during a video conference. For the bidirectional data transmission, each of the third terminal apparatus 130 and the fourth terminal apparatus 140 may encode video data (for example, a video picture stream acquired by the terminal apparatus), to transmit the encoded video data to the other of the third terminal apparatus 130 and the fourth terminal apparatus 140 through the network 150. Each of the third terminal apparatus 130 and the fourth terminal apparatus 140 may further receive the encoded video data transmitted by the other of the third terminal apparatus 130 and the fourth terminal apparatus 140, may decode the encoded video data to restore the video data, and may display a video picture on an accessible display apparatus according to the restored video data.

In the embodiment of FIG. 1, the first terminal apparatus 110, the second terminal apparatus 120, the third terminal apparatus 130, and the fourth terminal apparatus 140 may be servers, personal computers, and smartphones, but the principles disclosed in the disclosure may be not limited thereto. The embodiments disclosed in the disclosure are applicable to a laptop computer, a tablet computer, a media player, and/or a dedicated video conference device. The network 150 represents any quantity of networks through which the encoded video data is transmitted among the first terminal apparatus 110, the second terminal apparatus 120, the third terminal apparatus 130, and the fourth terminal apparatus 140, and includes, for example, a wired and/or wireless communication network. The communication network 150 may switch data in a circuit switched and/or packet switched channel. The network may include a telecommunication network, a local area network, a wide area network, and/or the Internet. For the purpose of the disclosure, unless explained in the following, an architecture and a topology of the network 150 may be insignificant for operations disclosed in the disclosure.

Figure 2:
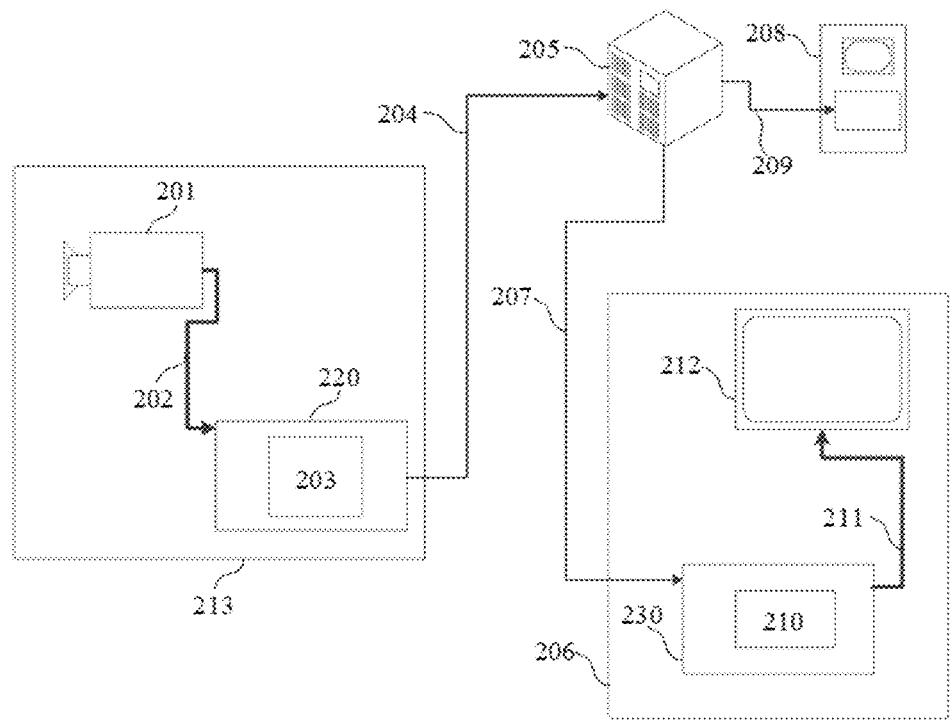
FIG. 2 shows a schematic diagram of a placement manner of a video encoding apparatus and a video decoding apparatus in a streaming environment.

In an embodiment of the disclosure, FIG. 2 shows a schematic diagram of a placement manner of a video encoding apparatus and a video decoding apparatus in a streaming environment. The theme disclosed in the disclosure is equivalently applicable to other applications supporting a video, including, for example, a video conference, a digital TV, or an application for storing a compressed video to a digital medium such as a CD, a DVD, or a memory stick.

A streaming system may include an acquisition subsystem 213, the acquisition subsystem 213 may include a video source 201 such as a digital camera, and the video source 201 creates an uncompressed video picture stream 202. In an embodiment, the video picture stream 202 includes a sample shot by a digital camera. Compared with encoded video data 204 (or an encoded video code stream 204), the video picture stream 202 is a video picture stream depicted as a thick line to emphasize a high data volume, the video picture stream 202 may be processed by an electronic device 220, and the electronic device 220 includes a video encoding apparatus 203 coupled to the video source 201. The video encoding apparatus 203 may include hardware, software, or a combination of hardware and software to implement or perform aspects of the disclosed theme described in more detail below. Compared with the video picture stream 202, the encoded video data 204 (or the encoded video code stream 204) is encoded video data 204 (or an encoded video code stream 204) depicted as a thin line to emphasize a lower data volume, and may be stored in a streaming server 205 for future use. One or more streaming client subsystems, for example, a client subsystem 206 and a client subsystem 208 in FIG. 2, may access the streaming server 205 to retrieve a copy 207 and a copy 209 of the encoded video data 204. The client subsystem 206 may include, for example, a video decoding apparatus 210 in the electronic device 230. The video decoding apparatus 210 decodes the copy 207 of the encoded video data, and generate an output video picture stream 211 that may be displayed on a display 212 (for example, a display screen) or another display apparatus. In some streaming systems, the encoded video data 204, video data 207, and video data 209 (for example, video code streams) may be encoded according to some video coding/compression standards. For example, the video coding/compression standards may include ITU-T H.265. In an embodiment, a video coding standard under development is informally referred to as next-generation video coding (namely, versatile video coding (VVC)), and the disclosure may be used in a context of the VVC standard.

The electronic device 220 and the electronic device 230 may include other components not shown in the figure. For example, the electronic device 220 may include a video decoding apparatus, and the electronic device 230 may further include a video encoding apparatus.

The implementations of the technical solution of this embodiment of the disclosure are described in detail in the following.

Figure 3:
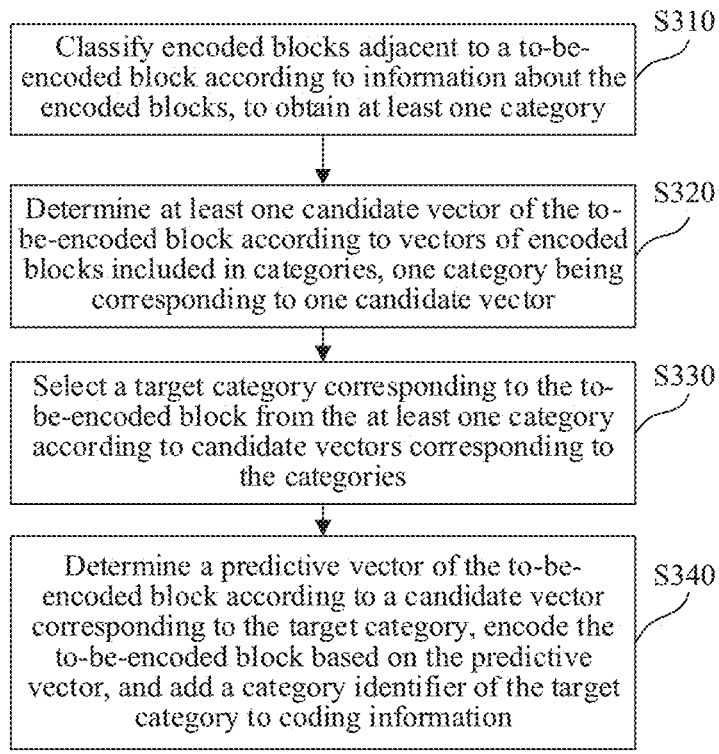
FIG. 3 shows a flowchart of a video encoding method according to an example embodiment of the disclosure.

FIG. 3 shows a flowchart of a video encoding method according to an embodiment of the disclosure. The video encoding method may be performed by the video encoding apparatus in the foregoing embodiment. Referring to FIG. 3, the video encoding method includes at least operation S310 to operation S340, which are described in detail as follows, In operation S310, encoded blocks adjacent to a target block to be encoded (or referred to as a to-be-encoded block) are classified according to information about the encoded blocks, to obtain at least one category.

First, a vector mentioned in the following may be a motion vector (MV) or a block vector (BV). Specifically, when an inter coding manner is used, the vector is understood as an MV; and when an intra block copy (IBC) manner is used, the vector is understood as a BV.

In an embodiment of the disclosure, a list with a length of n may be constructed, and the list is used for recording information about the encoded blocks adjacent to the target block. In addition to vectors of the encoded blocks, the list may further record the following information of the encoded blocks:

size information of an encoded block, such as a width or a height;

position information of the encoded blocks, such as a horizontal coordinate or a vertical coordinate of an upper left corner of an encoded block; and a quantity of vector occurrences of an encoded block, where a quantity of vector occurrences of an encoded block newly added to the list may be set to 1.

In an embodiment of the disclosure, in a case that a new encoded block (for ease of description, the encoded block is indicated as encoded block 1 below) needs to be added to the list, whether a vector of encoded block 1 is the same as a vector of an existing encoded block in the list may be compared to determine if the encoded block 1 and the existing encoded block are duplicated; in a case that the vector of encoded block 1 is different from the vector of the encoded block in the list, it indicates that the vector of encoded block 1 is not the same as the vector of the existing encoded block in the list, i.e., that the vector of the encoded block 1 does not overlap with the vector of the existing encoded block in the list, and information about encoded block 1 is directly added to the list; in a case that the vector of encoded block 1 is the same as a vector of an encoded block (for ease of description, the encoded block is recorded as encoded block 2 below) in the list, it indicates that the vector of encoded block 1 is the same as the vector of encoded block 2 in the list, and information about the encoded block in the list may be updated in the following manners:

in a case that a size of encoded block 1 is greater than a size of encoded block 2, updating the size of encoded block 2 recorded in the list according to the size of encoded block 1;

updating spatial position information of encoded block 2 recorded in the list according to spatial position information of encoded block 1; and updating a quantity of vector occurrences of encoded block 2 stored in the list, for example, adding the quantity of vector occurrences of encoded block 2 recorded in the list by 1.

In an embodiment of the disclosure, information about encoded block 1 may further be directly added to the list, and then a quantity of vector occurrences of encoded block 1 and encoded block 2 are updated, for example, the quantities of vector occurrences of encoded block 1 and encoded block 2 are both added by 1.

In an embodiment of the disclosure, after the list is constructed, the encoded blocks recorded in the list may be classified. The following optional classification methods are included.

Classification is performed according to sizes of the encoded blocks.

Figure 4A:
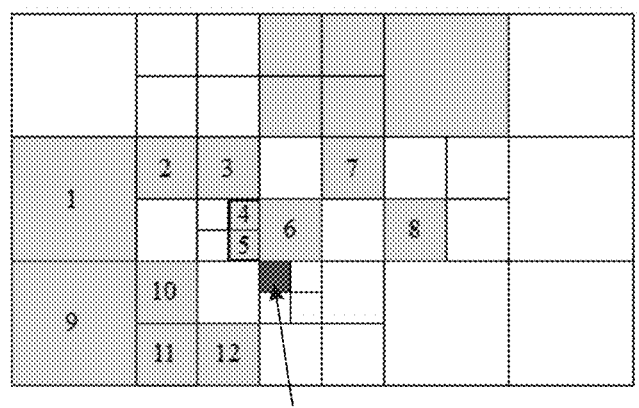
FIG. 4A shows a schematic diagram of position relationships between encoded blocks and a target block to be encoded according to an example embodiment of the disclosure.

In an embodiment of the disclosure, a size threshold may be set, and then encoded blocks whose sizes are greater than or equal to the size threshold are classified into one category. Certainly, encoded blocks whose sizes are less than the size threshold may also be classified into one category. For example, as shown in FIG. 4A, according to sizes, encoded block 1 and encoded block 9 may be classified into one category, and other encoded blocks may be classified into another category. FIG. 4A shows some encoded blocks around the target block to be encoded (or referred to as the to-be-encoded block), and the encoded blocks are marked by using light gray.

In an embodiment of the disclosure, a size of an encoded block may be a product of a width and a height, or may be a sum of a width and a height, or may be a width of the encoded block, or may be a height of the encoded block, or may be a maximum value of a width and a height of the encoded block, or may be a minimum value of a width and a height of the encoded block.

Classification is performed according to positions of the encoded blocks.

Figure 4B:
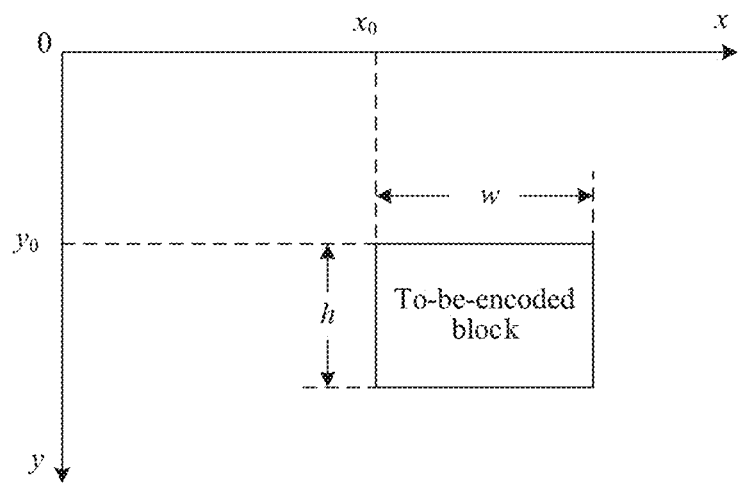
FIG. 4B shows a schematic diagram of a position of a target block to be encoded in a pixel coordinate system according to an example embodiment of the disclosure.

In an embodiment of the disclosure, as shown in FIG. 4B, in a pixel coordinate system, assuming that coordinates of an upper-left pixel of the target block to be encoded are $(x_0, y_0)$, a height and a width of the target block are respectively h and w, and coordinates of an upper-left pixel of an $i^{th}$ encoded block are $(x_i, y_i)$, the encoded blocks may be classified according to the following classification manners:

classifying encoded blocks whose $x_i<x_0$ into one category, namely, classifying encoded blocks located left of the target block into one category, for example, in FIG. 4A, classifying encoded blocks 1, 2, 3, 4, 5, 9, 10, 11, and 12 located left of the target block into one category;

classifying encoded blocks whose $x_i<x_0$ and $y_i<y_0$ into one category, namely, classifying encoded blocks located upper left of the target block into one category, for example, in FIG. 4A, classifying encoded blocks 1, 2, 3, 4, and 5 located upper left of the target block into one category;

classifying encoded blocks whose $x_i<x_0$ and $y_i>y_0+h$ into one category, namely, classifying encoded blocks located lower left of the target block into one category, for example, in FIG. 4A, classifying encoded blocks 11 and 12 located lower left of the target encoded block into one category;

classifying encoded blocks whose $x_i<x_0$ and $y_0 \leq y_i \leq y_0+h$ into one category, namely, classifying encoded blocks located just left of the target block into one category, for example, in FIG. 4A, classifying encoded blocks 9 and 10 located just left of the target block into one category;

classifying encoded blocks whose $y_i<y_0$ into one category, namely, classifying encoded blocks located above the target block into one category, for example, in FIG. 4A, classifying encoded blocks 1, 2, 3, 4, 5, 6, 7, and 8 located above the target block into one category;

classifying encoded blocks whose $x_0 \leq x_i \leq x_0+w$ and $y_i<y_0$ into one category, namely, classifying encoded blocks located just above the target block into one category, for example, in FIG. 4A, classifying encoded block 6 located just above the target block into one category;

classifying encoded blocks whose $x_i>x_0+w$ into one category, namely, classifying encoded blocks located right of the target block into one category, for example, in FIG. 4A, classifying encoded blocks 7 and 8 located right of the target block into one category;

classifying encoded blocks whose $x_i>x_0+w$ and $y_i<y_0$ into one category, namely, classifying encoded blocks located upper right of the target block into one category, for example, in FIG. 4A, classifying encoded blocks 7 and 8 located upper right of the target block into one category;

classifying encoded blocks whose $x_i>x_0+w$ and $y_i>y_0+h$ into one category, namely, classifying encoded blocks located lower right of the target block into one category; and classifying encoded blocks whose $x_i>x_0+w$ and $y_0 \leq y_i \leq y_0+h$ into one category, namely, classifying encoded blocks located just right of the target block into one category.

Classification is performed according to quantities of vector occurrences of the encoded blocks.

In an embodiment of the disclosure, a threshold of a quantity of vector occurrences may be set, and then encoded blocks whose quantity of vector occurrences is greater than or equal to the threshold of the quantity of vector occurrences are classified into one category. Certainly, encoded blocks whose quantity of vector occurrences is less than the threshold of the quantity of vector occurrences are classified into one category.

Still referring to FIG. 3, in operation S320, at least one candidate vector of the target block is determined according to vectors of encoded blocks included in categories, one category being corresponding to one candidate vector.

In an embodiment of the disclosure, in a case that an IBC manner is used, the encoded blocks included in the categories may be sorted, and then a vector (namely, BV) of an encoded block ranked first in the categories according to the order is used as a candidate vector (namely, candidate BV) of the target block. Certainly, a vector of an encoded block ranked second or in another position may also be used as a candidate vector of the target block.

In an embodiment of the disclosure, in a case in which inter coding is used, a reference frame of another encoded block may be different from a reference frame of the target block. Therefore, an MV of the another encoded block needs to be scaled according to a distance between the another encoded block and the reference frame and a distance between the target block and the reference frame, to obtain a candidate MV of the target. For example, the encoded blocks included in the categories may be sorted, and then an MV of an encoded block ranked first according to the order in the categories is scaled to obtain a candidate MV of the target block. Certainly, a vector of an encoded block ranked second or in another position may also be scaled to obtain a candidate MV of the target block.

In an embodiment of the disclosure, the target blocks to be encoded may be sorted according to a reverse encoding order, that is, an encoded block whose encoding order is closer to the target block has a higher priority in the categories; or the encoded blocks may be sorted according to a descending order of sizes of the encoded blocks; or the encoded blocks may be sorted according to according to an ascending order of distances between the encoded blocks and the target block. Certainly, the encoded blocks may also be sorted according to a descending order of the quantities of vector occurrences.

Still referring to FIG. 3, in operation S330, a target category corresponding to the target block to be encoded is selected from the at least one category according to candidate vectors corresponding to the categories.

In an embodiment of the disclosure, an encoding cost for using each candidate vector as a predictive vector of the target block may be calculated according to the candidate vectors corresponding to the categories, then a candidate vector with a minimum encoding cost may be selected, and a category corresponding to the candidate vector may be used as the target category.

In operation S340, a predictive vector of the target block to be encoded is determined according to a candidate vector corresponding to the target category, the target block is encoded based on the predictive vector, and a category identifier of the target category is added to coding information.

In an embodiment of the disclosure, the category identifier of the target category may be an index identifier of the target category. For example, after the encoded blocks are classified, a candidate category list may be generated, then information about at least one category obtained through classification is stored to the candidate category list, and the index identifier of the target category may be determined in the candidate category list.

In an embodiment of the disclosure, the at least one category obtained through classification may be added to the candidate category list according to a predetermined order. In this case, in a case that a vector corresponding to a category to be added to the candidate category list is the same as a vector corresponding to an existing category in the candidate category list, the following processing manners may be used:

directly adding the category to the candidate category list;

not adding the category to the candidate category list; and finding the first vector that is not the same as any vector corresponding to the existing category in the candidate category list from positions (−w, 0), (0, −h), (−w, −h), (−2w, 0), and (0, −2h) that are relative to the current target block to be encoded sequentially as the vector corresponding to the category, and adding the vector to the candidate category list. The vector search order in this embodiment is merely an example, and other orders may also be set in other embodiments of the disclosure.

In an embodiment of the disclosure, in the process of adding the at least one category obtained through classification to the candidate category list according to a predetermined order, in a case that a category does not include any encoded block, the following processing manners may be used:

not adding the category to the candidate category list;

finding the first vector from positions (−w, 0), (0, −h), (−w, −h), (−2w, 0), and (0, −2h) that are relative to the current target block to be encoded as the vector sequentially corresponding to the category, and adding the vector to the candidate category list; and finding the first vector that is not the same as any vector corresponding to the existing category in the candidate category list from positions (−w, 0), (0, −h), (−w, −h), (−2w, 0), and (0, −2h) that are relative to the current target block to be encoded sequentially as the vector corresponding to the category, and adding the vector to the candidate category list.

Figure 4C:
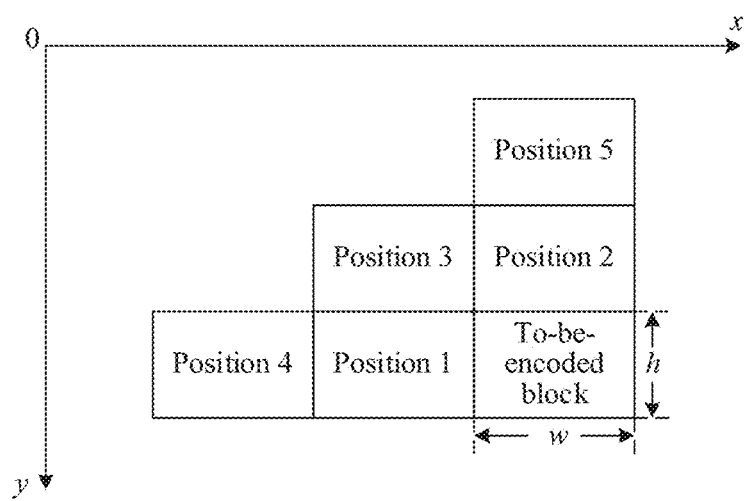
FIG. 4C shows a schematic diagram of positions of a target block to be encoded and encoded blocks in a pixel coordinate system according to an example embodiment of the disclosure.

As shown in FIG. 4C, position (−w, 0) relative to the current target block to be encoded (or referred to as the to-be-encoded block) is position 1, position (0, −h) relative to the current target block is position 2, position (−w, −h) relative to the current target block is position 3, position (−2w, 0) relative to the current target block is position 4, and position (0, −2h) relative to the current to-be-encoded block is position 5.

In an embodiment of the disclosure, in a case that an IBC manner is used, a candidate vector (namely, a candidate BV) corresponding to the target category may be used as a predictive vector (namely, a predictive BV) of the target block to be encoded. However, in a case in which inter coding is used, a reference frame of another encoded block (the another encoded block in this embodiment is an encoded block included in the target category, and an MV of the encoded block is used as a candidate MV corresponding to the target category) may be different from a reference frame of the target block. Therefore, MV_ref of the another encoded block needs to be scaled according to a distance d_ref between the another encoded block and the reference frame and a distance d between the target block and the reference frame, that is, a candidate MV of the target block is $$MV = MV\_ref \times \frac{d}{d\_ref}.$$

In an embodiment of the disclosure, in a case that an inter coding manner is used, the target block may be encoded in combination with the predictive vector (namely, the predictive MV) in a manner similar to merge, skip, or AMVP (advanced motion vector prediction).

After the candidate category list is constructed based on the classification method, in a merge mode, MVs corresponding to candidate categories are traversed, and a category with a minimum rate-distortion cost is selected as an optimal category (namely, the target category). In a case that an encoder and a decoder establish a candidate category list in the same manner, the encoder only needs to transmit an index identifier of the optimal category in the candidate category list. A skip mode is an exception of the merge mode. That is, after the optimal category is found in the merge mode, in a case that the target block and a reference encoded block are basically the same, residual data does not need to be transmitted, and only the index identifier of the optimal category and one skip flag need to be transmitted. An AMVP mode is different from the merge mode. In the AMVP mode, an optimal category is selected from the candidate category list, and differential encoding is performed on an optimal MV obtained through motion search by using a predictive MV corresponding to the optimal category and the current target block, that is, an MVD (motion vector difference) is encoded, where MVD=MV−MVP (motion vector prediction). In addition, by establishing the same candidate category list, the decoder end only needs sequence numbers of the MVD and the MVP in the candidate category list to calculate an MV of the current target block.

In an embodiment of the disclosure, in a case that an IBC manner is used, the target block may be encoded in combination with the predictive vector (namely, the predictive BV). Specifically, three modes may be used to perform encoding prediction, and the three modes are a skip mode, a direct mode, and a bvp (block vector predictor) mode.

Specifically, after the candidate category list is constructed based on the classification method, in the direct mode, BVs corresponding to candidate categories are traversed, and a category with a minimum rate-distortion cost is selected as an optimal category (namely, the target category). In a case that an encoder and a decoder establish a candidate category list in the same manner, the encoder only needs to transmit an index identifier of the optimal category in the candidate category list. The skip mode is an exception of the direct mode. That is, after the optimal category is found in the direct mode, in a case that the target block and a reference encoded block are basically the same, residual data does not need to be transmitted, and only the index identifier of the optimal category and one skip flag need to be transmitted. In the BVP mode, an optimal category is selected from the candidate category list, and differential encoding is performed on an optimal BV obtained through motion search by using a predictive BV corresponding to the optimal category and the current target block, that is, a BVD (block vector difference) is encoded, where BVD=BV−BVP. By establishing the same candidate category list, the decoder end only needs sequence numbers of the BVD and the optimal category in the candidate category list to calculate a BV of the current target block, In an example, pseudocode described by grammars corresponding to the skip mode, the direct mode, and the bvp mode is shown in Table 1:

TABLE 1

| | Descriptor |
|---|---|
| if( IbcCuFlag ){ | |
|   ibc_skip_flag | ae(v) |
|   if( IbcSkipFlag ) | |
|     ibc_direct_flag | |
|   if( IbcSkipFlag || IbcDirectFlag) | ae(v) |
|     ibc_skip_index | ae(v) |
|   else{ | |
|     bvp_index | ae(v) |
|   } | |

Referring to Table 1, when IbcCuFlag=1, it indicates that encoding is performed in the IBC manner; when ibc_skip_flag=1, it indicates that encoding is performed in the skip mode; when ibc_skip_flag=0 and ibc_direct_flag=1, it indicates that encoding is performed in the direct mode; and when ibc_skip_flag=0 and ibc_direct_flag=0, it indicates that encoding is performed in the bvp mode.

In the foregoing embodiments of the disclosure, a category identifier of a target category is added to coding information, so that the decoder end can determine the target category according to the category identifier, and further perform decoding based on information included in the determined target category.

The execution order of the operations shown in FIG. 3 is merely an example. In other embodiments of the disclosure, the execution order of operation S310 and operation S320 may be exchanged. For example, operation S320 may be performed first, and then operation S310 is performed; or operation S310 and operation S320 may be performed at the same time.

In the technical solution of the embodiment shown in FIG. 3, the information about the encoded blocks adjacent to the target block can be used to encode the target block, thereby reducing a quantity of redundant predictive vectors. In addition, the encoded blocks are classified, and the target block is encoded based on the vectors of the encoded blocks included in the target category. Therefore, an encoded block relatively highly correlated can also be classified into the target category. In this way, it is also ensured that the encoded block relatively highly correlated has a relatively small sequence number, and encoding efficiency can be improved.

Figure 5:
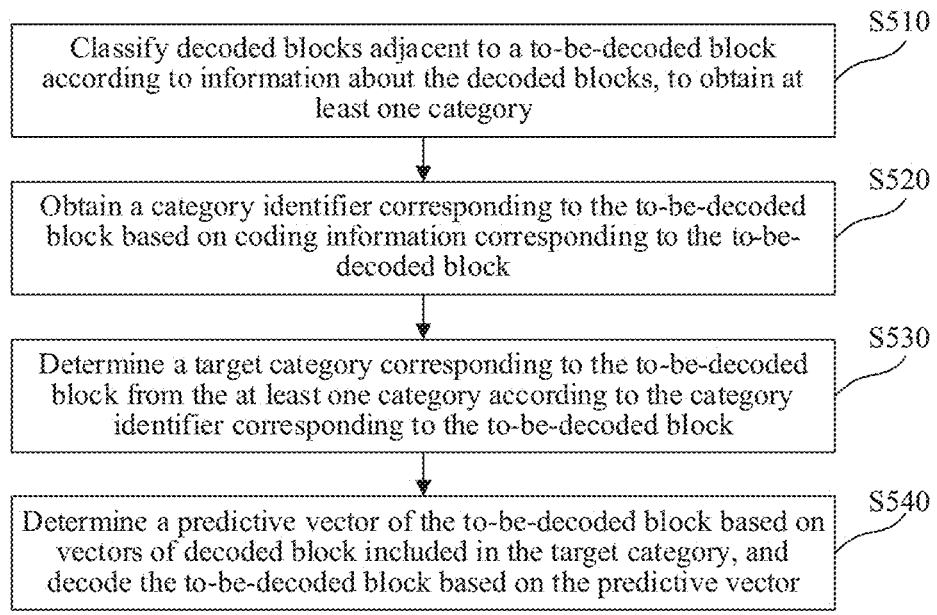
FIG. 5 shows a flowchart of a video decoding method according to an example embodiment of the disclosure.

FIG. 5 shows a flowchart of a video decoding method according to an embodiment of the disclosure. The video decoding method may be performed by the video decoding apparatus in the foregoing embodiment. Referring to FIG. 5, the video decoding method includes at least operation S510 to operation S540, which are described in detail as follows.

In operation S510, decoded blocks adjacent to a target block to be decoded (or referred to as a to-be-decoded block) are classified according to information about the decoded blocks, to obtain at least one category.

In an embodiment of the disclosure, a decoder end may generate a list of the decoded blocks adjacent to the target block in a manner similar to that of an encoder end, and the list is used for storing information about the decoded blocks. For example, vectors of the decoded blocks, size dimensions of the decoded blocks, spatial positions of the decoded blocks, and quantities of vector occurrences of the decoded blocks may be stored.

In an embodiment of the disclosure, when a new decoded block needs to be added to the list, the list may be updated according to information about the new decoded block. For example, in a case that a vector of the new decoded block is different from the vectors of the decoded blocks in the list, the information about the new decoded block is added to the list; or in a case that a vector of the new decoded block is the same as a vector of a target decoded block in the list, information about the target decoded block stored in the list may be updated according to the information about the new decoded block.

In an embodiment of the disclosure, the updating, in a case that a vector of the new decoded block is the same as a vector of a target decoded block in the list, information about the target decoded block stored in the list according to the information about the new decoded block may include at least one of the following:

- in a case that a size of the new decoded block is greater than a size of the target decoded block, updating the size of the target decoded block stored in the list according to the size of the new decoded block;
- updating spatial position information of the target decoded block stored in the list according to spatial position information of the new decoded block; and
- updating a quantity of vector occurrences of the target decoded block stored in the list, for example, adding the quantity of vector occurrences of the target decoded block recorded in the list by 1.

In an embodiment of the disclosure, in a case that a vector of the new decoded block is the same as a vector of a target decoded block in the list, information about the new decoded block may be added to the list as a list instance, and a quantity of vector occurrences of the new decoded block and the quantity of vector occurrences of the target decoded block stored in the list may be updated, for example, the quantities of vector occurrences are added by 1.

In an embodiment of the disclosure, during classifying decoded blocks adjacent to a target block according to information about the decoded blocks, optional classification methods include the following:

The decoded blocks are classified according to size dimensions of the decoded blocks.

In an embodiment of the disclosure, according to size dimensions of the decoded blocks, decoded blocks whose sizes are greater than (or greater than or equal to) a first threshold may be classified into one category. Decoded blocks whose sizes are less than the first threshold may also be classified into one category.

The size of a decoded block includes any one of the following: a product of a width and a height of the decoded block, a sum of the width and the height of the decoded block, the width of the decoded block, the height of the decoded block, a maximum value of the height and the width of the decoded block, and a minimum value of the height and the width of the decoded block.

The decoded blocks are classified according to spatial position relationships between the decoded blocks and the target block.

In an embodiment of the disclosure, in a pixel coordinate system, assuming that coordinates of an upper-left pixel of the target block are $(x_0, y_0)$, a height and a width of the target block are respectively h and w, and coordinates of an upper-left pixel of an $i^{th}$ decoded block are $(x_i, y_i)$, the decoded blocks may be classified according to the following classification manners:

- classifying decoded blocks whose $x_i<x_0$ into one category, namely, classifying decoded blocks located left of the target block into one category;
- classifying decoded blocks whose $x_i<x_0$ and $y_i<y_0$ into one category, namely, classifying decoded blocks located upper left of the target block into one category;
- classifying decoded blocks whose $x_i<x_0$ and $y_i>y_0+h$ into one category, namely, classifying decoded blocks located lower left of the target block into one category;
- classifying decoded blocks whose $x_i<x_0$ and $y_0\leq y_i\leq y_0+h$ into one category, namely, classifying decoded blocks located just left of the target block into one category;
- classifying decoded blocks whose $y_i<y_0$ into one category, namely, classifying decoded blocks located right of the target block into one category;
- classifying decoded blocks whose $x_0\leq x_i\leq x_0+w$ and $y_i<y_0$ into one category, namely, classifying decoded blocks located just above the target block into one category;
- classifying decoded blocks whose $x_i>x_0+w$ into one category, namely, classifying decoded blocks located right of the target block into one category;
- classifying decoded blocks whose $x_i>x_0+w$ and $y_i<y_0$ into one category, namely, classifying decoded blocks located upper right of the target block into one category;
- classifying decoded blocks whose $x_i>x_0+w$ and $y_i>y_0+h$ into one category, namely, classifying decoded blocks located lower right of the target block into one category; and
- classifying decoded blocks whose $x_i>x_0+w$ and $y_0\leq y_i\leq y_0+h$ into one category, namely, classifying decoded blocks located just right of the target block into one category.

The decoded blocks are classified according to quantities of vector occurrences of the decoded blocks.

In an embodiment of the disclosure, decoded blocks whose quantity of vector occurrences of the decoded blocks is greater than or equal to a second threshold may be classified into one category according to the quantity of vector occurrences of the decoded blocks. Decoded blocks whose quantity of vector occurrences is less than the second threshold may also be classified into one category.

Still referring to FIG. 5, in operation S520, a category identifier corresponding to the target block to be decoded is obtained based on coding information corresponding to the target block.

In an embodiment of the disclosure, during encoding, the encoder end has added a category identifier of a selected target category to coding information. Therefore, the decoder end may obtain a category identifier corresponding to the target block based on the coding information corresponding to the target block.

In operation S530, a target category corresponding to the target block is determined from the at least one category according to the category identifier corresponding to the target block.

In an embodiment of the disclosure, a classification solution used when the decoder end classifies the decoded blocks needs to be the same as a classification solution used when the encoder end classifies the encoded blocks. In this case, the target category that corresponds to the target block and that is determined by the decoder end according to the category identifier corresponding to the target block can match the target category selected by the encoder end.

In an embodiment of the disclosure, the category identifier corresponding to the target block to be decoded may be an index identifier. In this case, after classifying the decoded blocks, the decoder end may generate a candidate category list, and store information about the at least one category to the candidate category list, so that the candidate category list may be searched for the target category according to the index identifier corresponding to the target block.

In an embodiment of the disclosure, similar to the operation of the encoder end, the at least one category may be added to the candidate category list according to a predetermined order. In this case, in a case that a vector corresponding to a category to be added to the candidate category list is the same as a vector corresponding to an existing category in the candidate category list, any process of the following may be performed:

directly adding the category to the candidate category list;
not adding the category to the candidate category list; and
selecting a vector different from the vector corresponding to the existing category from vectors corresponding to decoded blocks associated with positions of the target block, using the selected vector as the vector corresponding to the category to be added to the candidate category list, and adding the vector to the candidate category list.

In an embodiment of the disclosure, in the process of adding the at least one category to the candidate category list according to a predetermined order, in a case that a category to be added to the candidate category list includes no decoded block, any one process of the following is performed:

not adding the category to the candidate category list;
selecting one vector from vectors corresponding to decoded blocks associated with positions of the target block as a vector corresponding to the category to be added to the candidate category list, and adding the vector to the candidate category list; and
selecting a vector different from the vector corresponding to the existing category from vectors corresponding to decoded blocks associated with positions of the target block, using the selected vector as the vector corresponding to the category to be added to the candidate category list, and adding the vector to the candidate category list.

The decoded blocks associated with the positions of the target block include: a first decoded block located just left of the target block (namely, a decoded block relative to position (−w, 0) of the target block), a second decoded block located just above the target block (namely, a decoded block relative to position (0, −h) of the target block), a third decoded block located upper left of the target block (namely, a decoded block relative to position (−w, −h) of the target block), a fourth decoded block located just left of the first decoded block (namely, a decoded block relative to position (−2w, 0) of the target block), and a fifth decoded block located just above the second decoded block (namely, a decoded block relative to position (0, −2h) of the target block).

In operation S540, a predictive vector of the target block is determined based on vectors of decoded block included in the target category, and the target block is decoded based on the predictive vector.

In an embodiment of the disclosure, during determining of the predictive vector of the target block, the decoded blocks included in the target category may be sorted, to obtain a sorting result; and then a vector of a decoded block ranked at a specified position in the target category may be used as the predictive vector of the target block based on the sorting result. For example, a vector of a decoded block ranked first in the target category may be used as the predictive vector of the target block. Alternatively, a vector of a decoded block ranked second or in another position may be used as the predictive vector of the target block.

In an embodiment of the disclosure, when the decoded blocks included in the target category are sorted, the decoded blocks included in the target category may be sorted according to a decoding order of the decoded blocks included in the target category. For example, the decoded blocks included in the target category may be sorted according to an ascending order of distances between the decoded blocks and the target block.

In an embodiment of the disclosure, the decoded blocks included in the target category may be sorted according to size dimensions of the decoded blocks included in the target category. For example, the decoded blocks included in the target category may be sorted according to a descending order of sizes.

In an embodiment of the disclosure, the decoded blocks included in the target category may be sorted according to spatial distances between the decoded blocks included in the target category and the target block. For example, the decoded blocks included in the target category may be sorted according to an ascending order of the spatial distances between the decoded blocks and the target block.

In an embodiment of the disclosure, the decoded blocks included in the target category may be sorted according to quantities of vector occurrences of the decoded blocks included in the target category. For example, the decoded blocks included in the target category may be sorted according to a descending order of the quantities of vector occurrences.

In the technical solution of the embodiment shown in FIG. 5, information about the decoded blocks adjacent to the target block can be used to decode the target block, thereby reducing a quantity of redundant predictive vectors. In addition, the decoded blocks are classified, and the target block is decoded based on the vectors of the decoded blocks included in the target category. Therefore, a decoded block relatively highly correlated can also be classified into the target category. In this way, it is also ensured that the decoded block relatively highly correlated has a relatively small sequence number, and decoding efficiency can be improved.

In a technical solution of the embodiments of the disclosure, encoded blocks whose encoding orders or spatial positions are close to the target block may be classified may according to information such as sizes, positions, and a quantity of vector occurrences (when an inter coding manner is used, the vector is understood as an MV; and when an IBC manner is used, the vector is understood as a BV) of the encoded blocks, then a category of encoded blocks is selected to export a predictive vector (when the inter coding manner is used, the predictive vector is understood as a predictive MV; and when the IBC manner is used, the predictive vector is understood as a predictive BV) of the current target block, and the current target block is encoded in combination with the predictive vector. On one hand, the solution can fully use information about encoded blocks of all categories, and reduce a quantity of redundant predictive vectors; on the other hand, a predictive vector exported by an encoded block more highly correlated can have a smaller sequence number, thereby improving encoding efficiency.

In another technical solution of the embodiments of the disclosure, decoded blocks whose decoding orders or spatial positions are close to the target block may be classified may according to information such as sizes, positions, and a quantity of vector occurrences (when an inter coding manner is used, the vector is understood as an MV; and when an IBC manner is used, the vector is understood as a BV) of the decoded blocks, then a category of decoded blocks is selected to export a predictive vector (when the inter coding manner is used, the predictive vector is understood as a predictive MV; and when the IBC manner is used, the predictive vector is understood as a predictive BV) of the current target block, and the current target block is decoded in combination with the predictive vector. On one hand, the solution can fully use information about decoded blocks of all categories, and reduce a quantity of redundant predictive vectors; on the other hand, a predictive vector exported by a decoded block more highly correlated can have a smaller sequence number, thereby improving decoding efficiency.

The following describes apparatus embodiments of the disclosure, which may be used for performing the decoding method or encoding method in the foregoing embodiments of the disclosure. For details not disclosed in the apparatus embodiments of the disclosure, refer to the foregoing decoding method or encoding method embodiments of the disclosure.

Figure 6:
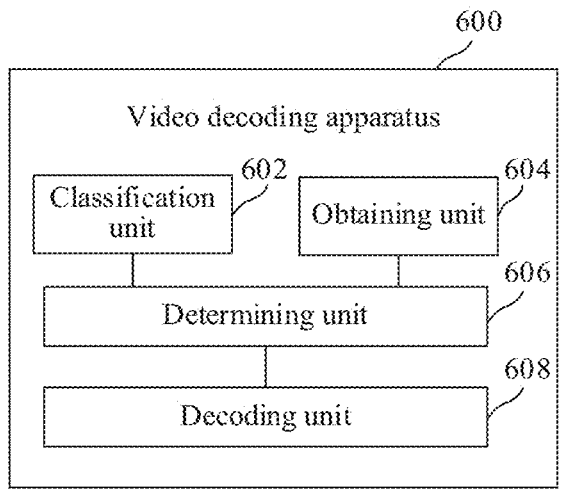
FIG. 6 shows a block diagram of a video decoding apparatus according to an example embodiment of the disclosure.

FIG. 6 shows a block diagram of a video decoding apparatus according to an embodiment of the disclosure.

Referring to FIG. 6, the video decoding apparatus 600 according to an embodiment of the disclosure includes: a classification unit 602, an obtaining unit 604, determining unit 606, and a decoding unit 608.

The classification unit 602 is configured to classify decoded blocks adjacent to a target block according to information about the decoded blocks, to obtain at least one category; the obtaining unit 604 is configured to obtain a category identifier corresponding to the to-be-decoded block based on coding information corresponding to the target block; the determining unit 606 is configured to determine a target category corresponding to the target block from the at least one category according to the category identifier corresponding to the target block; and the decoding unit 608 is configured to determine a predictive vector of the target block based on vectors of decoded blocks included in the target category, and decode the target block based on the predictive vector.

In some embodiments of the disclosure, based on the foregoing solution, the classification unit 602 is configured to classify the decoded blocks according to size dimensions of the decoded blocks; or classify the decoded blocks according to spatial position relationships between the decoded blocks and the target block; or classify the decoded blocks according to quantities of vector occurrences of the decoded blocks.

In some embodiments of the disclosure, based on the foregoing solution, the classification unit 602 is configured to classify decoded blocks whose sizes are greater than a first threshold into one category according to the size dimensions of the decoded blocks, where the size includes any one of the following: a product of a width and a height of the decoded block, a sum of the width and the height of the decoded block, the width of the decoded block, the height of the decoded block, a maximum value of the height and the width of the decoded block, and a minimum value of the height and the width of the decoded block.

In some embodiments of the disclosure, based on the foregoing solution, when classifying the decoded blocks according to spatial position relationships between the decoded. blocks and the target block, the classification unit 602 is configured to perform at least one of the following:
classifying decoded blocks located left of the target block into one category;
classifying decoded blocks located upper left of the target block into one category;
classifying decoded blocks located lower left of the target block into one category;
classifying decoded blocks located just left of the target block into one category;
classifying decoded blocks located above the target block into one category;
classifying decoded blocks located just above the target block into one category;
classifying decoded blocks located right of the target block into one category;
classifying decoded blocks located upper right of the target block into one category;
classifying decoded blocks located lower right of the target block into one category; and
classifying decoded blocks located just right of the target block into one category.

In some embodiments of the disclosure, based on the foregoing solution, in a case that in a pixel coordinate system, coordinates of an upper-left pixel of the target block to be decoded are $(x_0, y_0)$, a height and a width of the target block are respectively h and w, and coordinates of an upper-left pixel of an $i^{th}$ decoded block are $(x_i, y_i)$,
the decoded blocks located left of the target block are decoded blocks whose $x_i<x_0$;
the decoded blocks located upper left of the target block are decoded blocks whose $x_i<x_0$ and $y_i<y_0$;
the decoded blocks located upper left of the target block are decoded blocks whose $x_i<x_0$ and $y_i>y_0+h$;
the decoded blocks located just left of the target block are decoded blocks whose $x_i<x_0$ and $y_0 \leq y_i \leq y_0+h$;
the decoded blocks located above the target block are decoded blocks whose $y_i<y_0$;
the decoded blocks located just above the target block are decoded blocks whose $x_0 \leq x_i \leq x_0+w$ and $y_i<y_0$;
the decoded blocks located right of the target block are decoded blocks whose $x_i>x_0+w$;
the decoded blocks located upper right of the target block are decoded blocks whose $x_i>x_0+w$ and $y_i<y_0$;
the decoded blocks located lower right of the target block are decoded blocks whose $x_i>x_0+w$ and $y_i>y_0+h$; and
the decoded blocks located just right of the target block are decoded blocks whose $x_i>x_0+w$ and $y_0 \leq y_i \leq y_0+h$.

In some embodiments of the disclosure, based on the foregoing solution, the classification unit 602 is configured to classify decoded blocks whose quantity of vector occurrences of the decoded block are greater than or equal to a second threshold into one category according to the quantity of vector occurrences of the decoded block.

In some embodiments of the disclosure, based on the foregoing solution, the decoding unit 608 includes: a sorting unit, configured to sort the decoded blocks included in the target category, to obtain a sorting result; and a processing unit, configured to use a vector of a decoded block ranked at a specified position in the target category as the predictive vector of the target block based on the sorting result.

In some embodiments of the disclosure, based on the foregoing solution, the sorting unit is configured to: sort the decoded blocks included in the target category according to a decoding order of the decoded blocks included in the target category; or sort the decoded blocks included in the target category according to size dimensions of the decoded blocks included in the target category; or sort the decoded blocks included in the target category according to spatial distances between the decoded blocks included in the target category and the target block; or sort the decoded blocks included in the target category according to quantities of vector occurrences of the decoded blocks included in the target category.

In some embodiments of the disclosure, based on the foregoing solution, that the sorting unit sorts the decoded blocks included in the target category according to a decoding order of the decoded blocks included in the target category includes: sorting the decoded blocks included in the target category according to an ascending order of distances between the decoded blocks and the target block.

In some embodiments of the disclosure, based on the foregoing solution, that the sorting unit sorts the decoded blocks included in the target category according to size dimensions of the decoded blocks included in the target category includes: sorting the decoded blocks included in the target category according to according to a descending order of sizes.

In some embodiments of the disclosure, based on the foregoing solution, that the sorting unit sorts the decoded blocks included in the target category according to spatial distances between the decoded blocks included in the target category and the target block includes: sorting the decoded blocks included in the target category according to an ascending order of the spatial distances between the decoded blocks and the target block.

In some embodiments of the disclosure, based on the foregoing solution, that the sorting unit sorts the decoded blocks included in the target category according to quantities of vector occurrences of the decoded blocks included in the target category includes: sorting the decoded blocks included in the target category according to a descending order of the quantities of vector occurrences.

In some embodiments of the disclosure, based on the foregoing solution, the video decoding apparatus 600 further includes: a generation unit, configured to generate a list of the decoded blocks adjacent to the target block, the list being used for storing information about the decoded blocks; and an update unit, configured to update, in a case that a new decoded block needs to be added to the list, the list according to information about the new decoded block.

In some embodiments of the disclosure, based on the foregoing solution, the update unit is configured to add the information about the new decoded block to the list in a case that a vector of the new decoded block is different from vectors of the decoded blocks in the list; or update, in a case that a vector of the new decoded block is the same as a vector of a target decoded block in the list, information about the target decoded block stored in the list according to the information about the new decoded block.

In some embodiments of the disclosure, based on the foregoing solution, that the update unit updates information about the target decoded block stored in the list according to the information about the new decoded block includes at least one of the following: in a case that a size of the new decoded block is greater than a size of the target decoded block, updating the size of the target decoded block stored in the list according to the size of the new decoded block; updating spatial position information of the target decoded block stored in the list according to spatial position information of the new decoded block; and updating a quantity of vector occurrences of the target decoded block stored in the list.

In some embodiments of the disclosure, based on the foregoing solution, the video decoding apparatus 600 further includes: a second generation unit, configured to generate a candidate category list, and store information about the at least one category to the candidate category list; and the determining unit 606 is configured to search the candidate category list for the target category according to the category identifier corresponding to the target block.

In some embodiments of the disclosure, based on the foregoing solution, the second generation unit is configured to: add the at least one category to the candidate category list according to a predetermined order, and in a case that a vector corresponding to a category to be added to the candidate category list is the same as a vector corresponding to an existing category in the candidate category list, perform any process of the following:
    directly adding the category to be added to the candidate category list to the candidate category list;
    forbidding adding the category to be added to the candidate category list to the candidate category list; and
    selecting a vector different from the vector corresponding to the existing category from vectors corresponding to decoded blocks associated with positions of the target block, using the selected vector as the vector corresponding to the category to be added to the candidate category list, and adding the vector to the candidate category list.

In some embodiments of the disclosure, based on the foregoing solution, the second generation unit is configured to add the at least one category to the candidate category list according to a predetermined order, and in a case that a category to be added to the candidate category list includes no decoded block, perform the following any one process:
    forbidding adding the category to be added to the candidate category list to the candidate category list; and
    selecting one vector from vectors corresponding to decoded blocks associated with positions of the target block as a vector corresponding to the category to be added to the candidate category list, and adding the vector to the candidate category list; and
    selecting a vector different from the vector corresponding to the existing category from vectors corresponding to decoded blocks associated with positions of the target block, using the selected vector as the vector corresponding to the category to be added to the candidate category list, and adding the vector to the candidate category list.

In some embodiments of the disclosure, based on the foregoing solution, the decoded blocks associated with the positions of the target block include: a first decoded block located just left of the target block, a second decoded block located just above the target block, a third decoded block located upper left of the target block, a fourth decoded block located just left of the first decoded block, and a fifth decoded block located just above the second decoded block.

In some embodiments of the disclosure, based on the foregoing solution, the process of the second generation unit selecting a vector different from the vector corresponding to the existing category from vectors corresponding to decoded blocks associated with positions of the target block includes: selecting the first vector different from the vector corresponding to the existing category from vectors corresponding to the decoded blocks associated with the positions of the target block according to a predetermined order.

Figure 7:
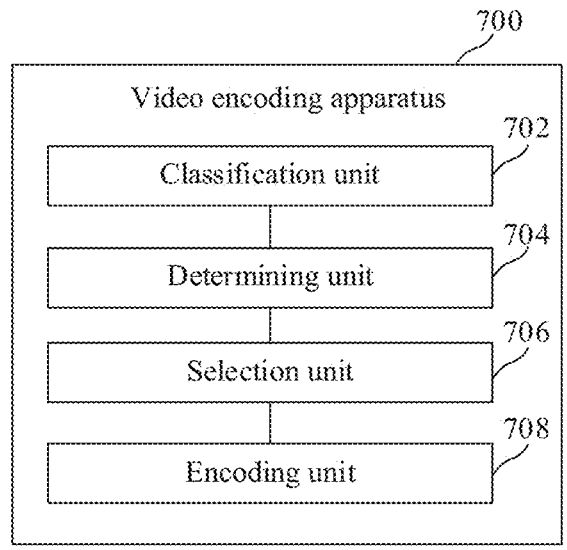
FIG. 7 shows a block diagram of a video encoding apparatus according to an example embodiment of the disclosure.

FIG. 7 shows a block diagram of a video encoding apparatus according to an embodiment of the disclosure.

Referring to FIG. 7, the video encoding apparatus 700 according to an embodiment of the disclosure includes: a classification unit 702, a determining unit 704, a selection unit 706, and an encoding unit 708.

The classification unit 702 is configured to classify encoded blocks adjacent to a target block according to information about the encoded blocks, to obtain at least one category; the determining unit 704 is configured to determine at least one candidate vector of the target block according to vectors of encoded blocks included in categories, one category being corresponding to one candidate vector; the selection unit 706 is configured to select a target category corresponding to the target block from the at least one category according to candidate vectors corresponding to the categories; and the encoding unit 708 is configured to determine a predictive vector of the target block according to a candidate vector corresponding to the target category, encode the target block based on the predictive vector, and add a category identifier of the target category to coding information.

Figure 8:
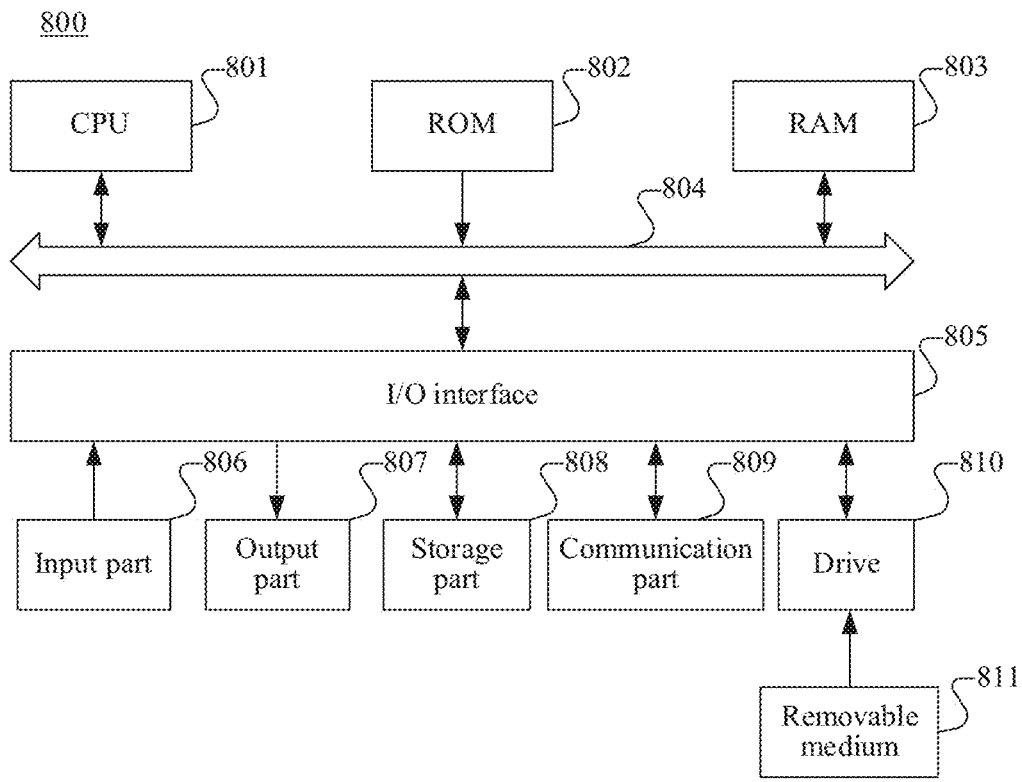
FIG. 8 is a schematic structural diagram of a computer system for implementing an electronic device according to an example embodiment of the disclosure.

FIG. 8 is a schematic structural diagram of a computer system for implementing an electronic device according to an embodiment of the disclosure.

A computer system 800 of the electronic device shown in FIG. 8 is merely an example, and does not constitute any limitation on functions and use ranges of the embodiments of the disclosure.

As shown in FIG. 8, the computer system 800 includes a central processing unit (CPU) 801, which may perform various suitable actions and processing based on a program stored in a read-only memory (ROM) 802 or a program loaded from a storage part 808 into a random access memory (RAM) 803, for example, perform the method described in the foregoing embodiments. The RAM 803 further stores various programs and data required for system operation. The CPU 801, the ROM 802, and the RAM 803 are connected to each other through a bus 804. An input/output (I/O) interface 805 is also connected to the bus 804.

The following components are connected to the I/O interface 805: an input part 806 including a keyboard, a mouse, or the like, an output part 807 including a cathode ray tube (CRT), a liquid crystal display (LCD), a speaker, or the like, a storage part 808 including a hard disk, or the like, and a communication part 809 including a network interface card such as a local area network (LAN) card or a modem. The communication part 809 performs communication processing by using a network such as the Internet. A drive 810 is also connected to the I/O interface 805 according to a requirement. A removable medium 811, such as a magnetic disk, an optical disc, a magneto-optical disk, or a semiconductor memory, is installed on the drive 810 as required, so that a computer program read from the removable medium is installed into the storage part 808 as required.

According to this embodiment of the disclosure, the processes described above with reference to the flowcharts may be implemented as computer software programs. For example, an embodiment of the disclosure includes a computer program product. The computer program product includes a computer program stored in a computer-readable medium. The computer program includes a computer program used for performing a method shown in the flowchart. In such an embodiment, the computer program may be downloaded and installed from the network through the communication portion 809, and/or installed from the removable medium 811. When the computer program is executed by the CPU 801, the various functions defined in the system of the disclosure are executed.

The computer-readable medium shown in the embodiments of the disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this embodiment of the disclosure, the computer-readable storage medium may be any tangible medium including or storing a program, and the program may be used by or in combination with an instruction execution system, apparatus or component. In this embodiment of the disclosure, the computer-readable signal medium may include a data signal transmitted in a baseband or as part of a carrier, and stores a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of the disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It should also be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the disclosure may be implemented in a software manner, or may be implemented in a hardware manner, and the unit described can also be set in a processor. Names of the units do not constitute a limitation on the units in a specific case.

According to another aspect, the disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although several modules or units of a device for action execution are mentioned in the foregoing detailed descriptions, the division is not mandatory. Actually, according to the implementations of the disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the disclosure.

After considering the specification and practicing the implementations of the present disclosure, a person skilled in the art may easily conceive of other implementations of the disclosure. The disclosure is intended to cover any variations, uses, or adaptive changes of the disclosure. These variations, uses, or adaptive changes follow the general principles of the disclosure and include common general knowledge or common technical means in the art, which are not disclosed in the disclosure.

The disclosure is not limited to the structures that are described above and that are shown in the accompanying drawings, and modifications and changes may be made without departing from the scope of the disclosure. The scope of the disclosure is subject only to the appended claims.

What is claimed is:

1. A video decoding method, comprising:
   classifying decoded blocks adjacent to a target block according to information about the decoded blocks, to obtain at least one category;
   obtaining a category identifier corresponding to the target block based on coding information corresponding to the target block;
   determining a target category corresponding to the target block from the at least one category according to the category identifier corresponding to the target block;
   determining a predictive vector of the target block based on vectors of decoded blocks comprised in the target category, and decoding the target block based on the predictive vector;
   generating a list of the decoded blocks adjacent to the target block, the list being used for storing information about the decoded blocks; and
   updating, in a case that a new decoded block needs to be added to the list, the list according to information about the new decoded block.

2. The video decoding method according to claim 1, wherein the classifying comprises at least one of:
   classifying the decoded blocks according to size dimensions of the decoded blocks;
   classifying the decoded blocks according to spatial position relationships between the decoded blocks and the target block; and
   classifying the decoded blocks according to quantities of vector occurrences of the decoded blocks.

3. The video decoding method according to claim 2, wherein the classifying the decoded blocks according to size dimensions of the decoded blocks comprises:
   classifying decoded blocks whose sizes are greater than a first threshold into one category according to the size dimensions of the decoded blocks, wherein the size comprises any one of the following: a product of a width and a height of the decoded block, a sum of a width and a height of the decoded block, a width of the decoded block, a height of the decoded block, a maximum value of the height and the width of the decoded block, and a minimum value of the height and the width of the decoded block.

4. The video decoding method according to claim 2, wherein the classifying the decoded blocks according to spatial position relationships between the decoded blocks and the target block comprises at least one of the following:
   classifying decoded blocks located left of the target block into one category;
   classifying decoded blocks located upper left of the target block into one category;
   classifying decoded blocks located lower left of the target block into one category;
   classifying decoded blocks located just left of the target block into one category;
   classifying decoded blocks located above the target block into one category;
   classifying decoded blocks located just above the target block into one category;
   classifying decoded blocks located right of the target block into one category;
   classifying decoded blocks located upper right of the target block into one category;
   classifying decoded blocks located lower right of the target block into one category; and
   classifying decoded blocks located just right of the target block into one category.

5. The video decoding method according to claim 4, wherein in a case that in a pixel coordinate system, coordinates of an upper-left pixel of the target block are $(x_0, y_0)$, a height and a width of the target block are respectively h and w, and coordinates of an upper-left pixel of an $i^{th}$ decoded block are $(x_i, y_i)$,
   the decoded blocks located left of the target block are decoded blocks whose $x_i < x_0$;
   the decoded blocks located upper left of the target block are decoded blocks whose $x_i < x_0$ and $y_i < y_0$;
   the decoded blocks located lower left of the target block are decoded blocks whose $x_i < x_0$ and $y_i > y_0 + h$;
   the decoded blocks located just left of the target block are decoded blocks whose $x_i < x_0$ and $y_0 \leq y_i \leq y_0 + h$;
   the decoded blocks located above the target block are decoded blocks whose $y_i < y_0$;
   the decoded blocks located just above the target block are decoded blocks whose $x_0 \leq x_i \leq x_0 + w$ and $y_i < y_0$;
   the decoded blocks located right of the target block are decoded blocks whose $x_i > x_0 + w$;
   the decoded blocks located upper right of the target block are decoded blocks whose $x_i > x_0 + w$ and $y_i < y_0$;
   the decoded blocks located lower right of the target block are decoded blocks whose $x_i > x_0 + w$ and $y_i > y_0 + h$; and
   the decoded blocks located just right of the target block are decoded blocks whose $x_i > x_0 + w$ and $y_0 \leq y_i \leq y_0 + h$.

6. The video decoding method according to claim 2, wherein the classifying the decoded blocks according to quantities of vector occurrences of the decoded blocks comprises:
   classifying decoded blocks whose quantities of vector occurrences of the decoded blocks are greater than or equal to a second threshold into one category according to the quantities of vector occurrences of the decoded blocks.

7. The video decoding method according to claim 1, wherein the determining a predictive vector of the target block based on vectors of decoded blocks comprised in the target category comprises:
sorting the decoded blocks comprised in the target category, to obtain a sorting result; and
using a vector of a decoded block ranked at a specified position in the target category as the predictive vector of the target block based on the sorting result.

8. The video decoding method according to claim 7, wherein the sorting the decoded blocks comprised in the target category comprises at least one of:
sorting the decoded blocks comprised in the target category according to a decoding order of the decoded blocks comprised in the target category;
sorting the decoded blocks comprised in the target category according to size dimensions of the decoded blocks comprised in the target category;
sorting the decoded blocks comprised in the target category according to spatial distances between the decoded blocks comprised in the target category and the target block; and
sorting the decoded blocks comprised in the target category according to quantities of vector occurrences of the decoded blocks comprised in the target category.

9. The video decoding method according to claim 8, wherein
the sorting the decoded blocks comprised in the target category according to a decoding order of the decoded blocks comprised in the target category comprises: sorting the decoded blocks comprised in the target category according to an ascending order of distances between the decoded blocks and the target block;
the sorting the decoded blocks comprised in the target category according to size dimensions of the decoded blocks comprised in the target category comprises: sorting the decoded blocks comprised in the target category according to a descending order of sizes;
the sorting the decoded blocks comprised in the target category according to spatial distances between the decoded blocks comprised in the target category and the target block comprises: sorting the decoded blocks comprised in the target category according to an ascending order of the spatial distances between the decoded blocks and the target block; and
the sorting the decoded blocks comprised in the target category according to quantities of vector occurrences of the decoded blocks comprised in the target category comprises: sorting the decoded blocks comprised in the target category according to a descending order of the quantities of vector occurrences.

10. The video decoding method according to claim 1, wherein the updating comprises at least one of:
adding the information about the new decoded block to the list in a case that a vector of the new decoded block is different from vectors of the decoded blocks in the list; and
updating, in a case that a vector of the new decoded block is the same as a vector of a target decoded block in the list, information about the target decoded block stored in the list according to the information about the new decoded block.

11. The video decoding method according to claim 10, wherein the updating comprises:
in a case that a size of the new decoded block is greater than a size of the target decoded block, updating the size of the target decoded block stored in the list according to the size of the new decoded block;
updating spatial position information of the target decoded block stored in the list according to spatial position information of the new decoded block; and
updating a quantity of vector occurrences of the target decoded block stored in the list.

12. The video decoding method according to claim 1, wherein after the classifying, the method further comprises: generating a candidate category list, and storing information about the at least one category to the candidate category list; and
the determining a target category corresponding to the target block from the at least one category according to the category identifier corresponding to the target block comprises:
searching the candidate category list for the target category according to the category identifier corresponding to the target block.

13. The video decoding method according to claim 12, wherein the storing comprises: adding the at least one category to the candidate category list according to a predetermined order, and in a case that a vector corresponding to a category to be added to the candidate category list is the same as a vector corresponding to an existing category in the candidate category list, performing any process of the following:
directly adding the category to be added to the candidate category list to the candidate category list;
forbidding adding the category to be added to the candidate category list to the candidate category list; and
selecting a vector different from the vector corresponding to the existing category from vectors corresponding to decoded blocks associated with positions of the target block, using the selected vector as the vector corresponding to the category to be added to the candidate category list, and adding the vector to the candidate category list.

14. The video decoding method according to claim 12, wherein the storing comprises: adding the at least one category to the candidate category list according to a predetermined order, and in a case that a category to be added to the candidate category list comprises no decoded block, performing any process of the following:
forbidding adding the category to be added to the candidate category list to the candidate category list;
selecting one vector from vectors corresponding to decoded blocks associated with positions of the target block as a vector corresponding to the category to be added to the candidate category list, and adding the vector to the candidate category list; and
selecting a vector different from the vector corresponding to the existing category from vectors corresponding to decoded blocks associated with positions of the target block, using the selected vector as the vector corresponding to the category to be added to the candidate category list, and adding the vector to the candidate category list.

15. The video decoding method according to claim 13, wherein the decoded blocks associated with the positions of the target block comprise:
a first decoded block located just left of the target block, a second decoded block located just above the target block, a third decoded block located upper left of the target block, a fourth decoded block located just left of the first decoded block, and a fifth decoded block located just above the second decoded block.

16. The video decoding method according to claim 13, wherein the selecting comprises:
  selecting the first vector different from the vector corresponding to the existing category from vectors corresponding to the decoded blocks associated with the positions of the target block according to a predetermined order.

17. A video decoding apparatus, comprising:
  at least one memory configured to store program code; and
  at least one processor configured to read the program code and operate as instructed by the program code, the program code comprising:
  classification code configured to cause the at least one processor to classify decoded blocks adjacent to a target block according to information about the decoded blocks, to obtain at least one category;
  obtaining code configured to cause the at least one processor to obtain a category identifier corresponding to the target block based on coding information corresponding to the target block;
  determining code configured to cause the at least one processor to determine a target category corresponding to the to-be-decoded block from the at least one category according to the category identifier corresponding to the target block;
  decoding code configured to cause the at least one processor to determine a predictive vector of the target block based on vectors of decoded blocks comprised in the target category, and decode the target block based on the predictive vector;
  generation code configured to cause the at least one processor to generate a list of the decoded blocks adjacent to the target block, the list being used for storing information about the decoded blocks; and
  update code configured to cause the at least one processor to update, in a case that a new decoded block needs to be added to the list, the list according to information about the new decoded block.

18. The video decoding apparatus according to claim 17, wherein the classification code is further configured to cause the at least one processor to at least one of:
  classify the decoded blocks according to size dimensions of the decoded blocks;
  classify the decoded blocks according to spatial position relationships between the decoded blocks and the target block; and
  classify the decoded blocks according to quantities of vector occurrences of the decoded blocks.

19. A computer-readable memory storage medium, storing a computer program that when executed by at least one processor causes the at least one processor to:
  classify decoded blocks adjacent to a target block according to information about the decoded blocks, to obtain at least one category;
  obtain a category identifier corresponding to the target block based on coding information corresponding to the target block;
  determine a target category corresponding to the target block from the at least one category according to the category identifier corresponding to the target block;
  determine a predictive vector of the target block based on vectors of decoded blocks comprised in the target category, and decode the target block based on the predictive vector;
  generate a list of the decoded blocks adjacent to the target block, the list being used for storing information about the decoded blocks; and
  update, in a case that a new decoded block needs to be added to the list, the list according to information about the new decoded block.

* * * * *